United States Patent [19]
Rohlf

[11] Patent Number: 5,694,668
[45] Date of Patent: Dec. 9, 1997

[54] WALL FORM HOOK ASSEMBLY

[75] Inventor: Bradley A. Rohlf, Red Wing, Minn.

[73] Assignee: D B Industries, Inc., Red Wing, Minn.

[21] Appl. No.: 519,367

[22] Filed: Aug. 25, 1995

[51] Int. Cl.$^6$ ................................................. A44B 13/00
[52] U.S. Cl. ........................ 24/599.5; 24/599.6; 24/600.1
[58] Field of Search ........................... 24/599.5, 599.1, 24/599.4, 599.3, 599.6, 598.1, 600.3, 600.1, 600.2; 294/82.2, 82.21

[56] References Cited

U.S. PATENT DOCUMENTS

| | | | |
|---|---|---|---|
| 401,173 | 4/1889 | Kempster | 24/599.1 |
| 705,526 | 7/1902 | Gray | 24/600.1 |
| 1,546,208 | 7/1925 | Cunningham | 24/599.5 |
| 1,554,303 | 9/1925 | Smith | 24/600.1 |
| 1,687,006 | 10/1928 | Cornelius | 294/82.2 |
| 2,256,164 | 9/1941 | Mahoney | 294/82.2 |
| 3,501,817 | 3/1970 | Bambenek et al. | 24/599.2 |
| 4,113,156 | 9/1978 | Brito | 24/599.6 |
| 4,122,585 | 10/1978 | Sharp et al. | 24/599.5 |
| 4,977,647 | 12/1990 | Casebolt | 24/599.5 |
| 5,177,837 | 1/1993 | Rekuc | 24/599.1 |

*Primary Examiner*—Victor N. Sakran
*Attorney, Agent, or Firm*—Moore & Hansen

[57] ABSTRACT

A double locking snap hook is provided with an extended hook shank and return portion to form a lengthened hook portion for use in conjunction with the assembly and disassembly of wall forms. A slot is provided in the hook shank through which may be inserted a strap made of webbing, leather or another sturdy, flexible material. This strap may in turn be connected to a worker's safety belt or harness, permitting the worker the use of both hands while securely attached to the wall form. In addition to other modifications, the return portion is narrowed somewhat to permit passage through the slots of the wall form bracing.

18 Claims, 1 Drawing Sheet

WALL FORM HOOK ASSEMBLY

BACKGROUND OF THE INVENTION

1. Technical Field

The present invention relates generally to locking snap hooks, and in particular to a double locking snap hook usable with wall forms as a worker positioning device for constructing poured concrete walls.

2. Background Information

Wall forms are generally four feet high by two feet wide, and are positioned one next to the other for forming concrete walls. Rows and columns of wall forms are constructed, resulting in a side having bracing and an opposite side that is smooth. To such walls are constructed, with the smooth sides facing each other a few inches apart, and concrete is poured between these two walls. Once the concrete sets, the walls constructed of the multiple forms may be removed.

Typically, an overhead crane is used for positioning the wall forms, which must be manually attached to each other. The attachment process requires a worker to scale the side of the wall with the exposed bracing, and use wires or other fastening members for attaching the bracing of one wall form to the bracing of an adjacent wall form. Slots are provided in the bracing for attachment of fastening members. These slots may also be used for locating fastening hooks, such as double looking snap hooks, to help the worker maintain a safe work position.

Safety requirements dictate the use of double locking snap hooks, which provide greater security and dependability for the worker. However, prior double locking snap hooks have proven unwieldy in this application. On some, for example, the hook member is too wide to fit through the slots of the wall form bracing. Double locking carabiners are available, but they don't provide the strength and security of snap hooks. Additionally, traditional snap hooks provide a webbing attachment portion only on the end of the handle thereof. This can cause a bending moment that results in the snap hook twisting and perhaps releasing from the slot in the wall form bracing.

The wall-form hook assembly of the present invention overcomes difficulties described above and affords other features and advantages heretofore not available.

SUMMARY OF THE INVENTION

The present wall form hook assembly starts with a double locking snap hook as disclosed in U.S. Pat. No. 4,977,647, issued to Casebolt on Dec. 18, 1990. This snap hook is then provided with an extended hook shank and return portion to form a lengthened hook portion. A slot is provided in the hook shank through which may be inserted a strap made of webbing, leather or another sturdy, flexible material. This strap may in turn be connected to a worker's safety belt or harness, permitting the worker the use of both hands while securely attached to the wall form. In addition to other modifications, the return portion is narrowed somewhat to permit passage through the slots of the wall form bracing.

It is an object of this invention to provide a double locking snap hook that may be used in conjunction with the bracing of a wall form to enable a worker to securely ascend the wall form for assembly and disassembly thereof. It is a further object of this invention to provide such a snap hook that will remain securely fastened to the wall form bracing, without concern that bending moment from the weight of the worker to which the snap hook is attached will cause it to twist out of the wall form bracing.

Other objects and advantages of the invention will become apparent from the following detailed description and from the appended drawings in which like numbers have been used to describe like parts throughout the several views.

DESCRIPTION OF THE PREFERRED EMBODIMENT

Figure 1:
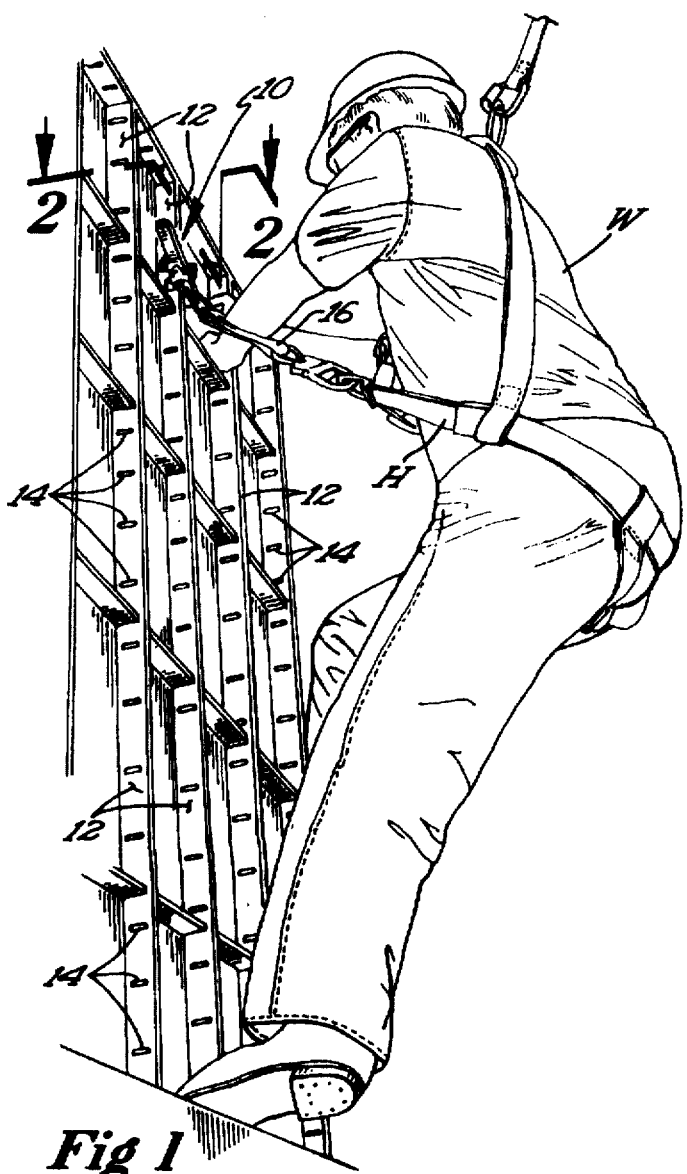
FIG. 1 is a perspective view of the subject wall form hook assembly in position attached to a wall form bracing and supporting a worker.

With reference to the drawings, and in particular to FIG. 1, the wall form hook assembly is generally indicated by reference numeral 10. Wall form hook 10 is connected to wall form bracing 12 though a slot 14 therein. A length of webbing 16 is also connected to wall form hook 10, and is in turn connected to the safety harness H of worker W.

Figure 2:
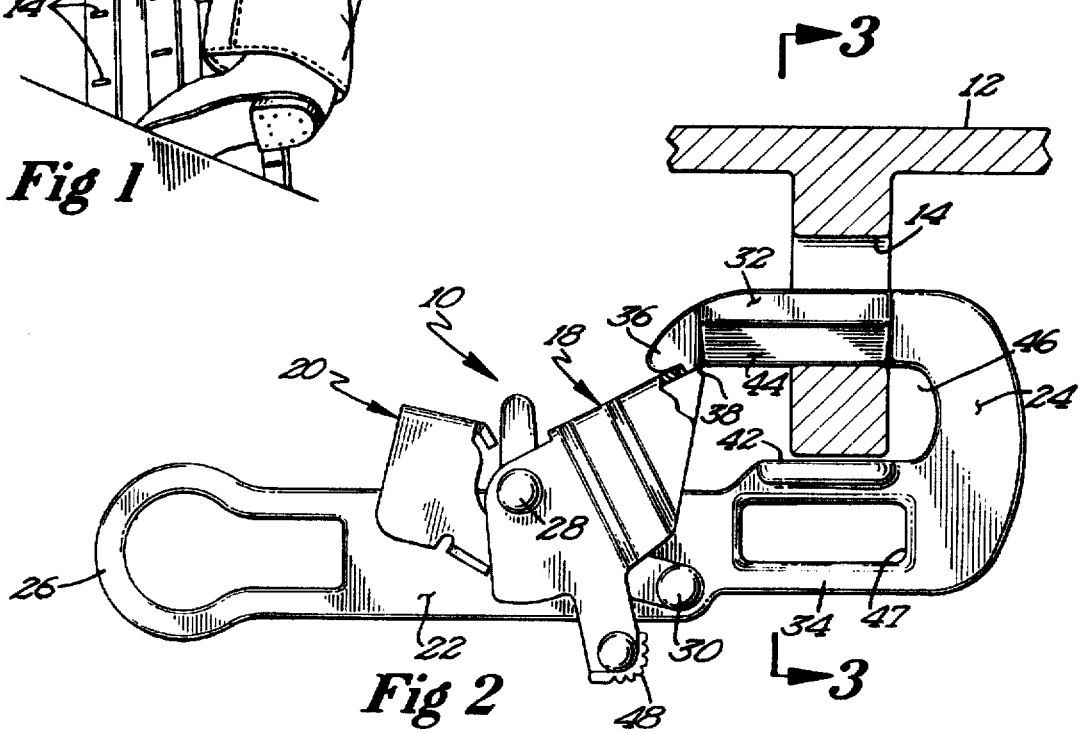
FIG. 2 is a plan view of the wall form hook assembly taken along line 2—2 of FIG. 1.

As shown in FIG. 2, wall form hook 10 includes a spring biased latch member 18 and a spring biased lock member 20, the operation and elements of which are disclosed in detail in U.S. Pat. No. 4,977,647, issued to Casebolt on Dec. 18, 1990, the specification of which is incorporated herein by reference. The body of wall form hook 10 includes a shank 22 extending between first end 24 and second end 26. Spring biased latch member 18 is pivotally mounted to shank 22 by latch member pin 28, and spring biased lock member 20 is pivotally mounted to shank 22 by lock member pin 30. The body of wall form hook 10 further includes an elongated return portion 32 opposably positioned from elongated neck portion 34. Elongated return portion 32 includes a nose 36 that engages the end 38 of spring biased latch member 18 when spring biased latch member 18 is in the closed position, as illustrated. As shown in FIG. 2, elongated return portion 32 is positioned within slot 14 of wall form bracing 12. Elongated neck portion 34 also includes a generally rectangular slot 40 passing therethrough.

Figure 3:
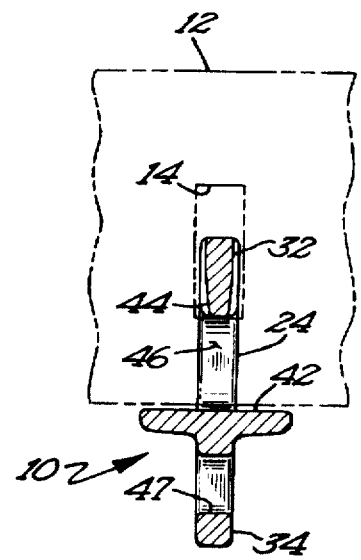
FIG. 3 is a partial section view of the wall form hook assembly taken along line 3—3 of FIG. 2.

Referring to FIG. 3, elongated neck portion 34 also includes a flange segment 42 extending to the sides thereof. Flange segment 42 prevents rotation of wall form hook 10 when engaged with slot 14, helping to keep the elongated return portion 32 of the hook securely positioned within the slot. In addition, elongated return portion 32 of wall form hook 10 preferably includes a tapered segment 44 along the length thereof adjacent throat 46 formed between elongated neck portion 34 and elongated return portion 32. Tapered segment 44 reduces rotational stress on elongated return portion 32 when a load is attached to wall form hook 10, as when a worker is attached thereto, preventing elongated return portion 32 from twisting and breaking off of wall form hook 10. Instead, the rotational forces placed on wall form hook 10 under loads are shifted to flange segment 42, which bears against wall form bracing 12 under moderate to heavy loads.

Finally, a support slot 47 is provided in elongated neck portion 34 to which webbing 16 may be attached for securing the worker W. Support slot 47 is provided in this location to balance the forces placed on wall form hook 10 to minimize twisting and the likelihood of failure of the device.

In use, worker W, while scaling wall form bracing 12, will engage wall form hook 10 to a slot 14 by first depressing spring biased lock member 20, and then depressing thumb actuation means 48 of spring biased latch member 18. With end 38 of spring biased latch member 18 thus disengaged from nose 36 of elongated return portion 32, the nose portion may be positioned within slot 14 of wall form bracing 12.

While the preferred embodiments of the invention have been described, it should be understood that various changes, adaptations and modifications may be made therein without departing from the spirit of the invention and the scope of the appended claims.

What is claimed is:

1. An improved double locking snap hook having a shank with a first end, an intermediate portion and a second end, the shank having an elongated neck portion extending between the first end and the intermediate portion, a return portion projecting from the first end of the shank forming a throat between the elongated neck portion of the shank and the return portion, a spring biased latch member pivotally mounted to the shank engageable with the return portion, and a spring biased lock member pivotally mounted to the shank for regulating the motion of the spring biased latch member, the improvement comprising:

a generally rectangular support slot positioned in the shank; and a flange segment projecting outwardly from the shank, positioned between the intermediate portion and the first end of the shank, adjacent to the throat.

2. The improved double locking snap hook described in claim 1, further comprising:

a tapered segment on said return portion, said tapered segment tapered generally inwardly toward the throat between the return portion and the elongated neck portion of the shank.

3. The improved double locking snap hook described in claim 1, further comprising:

a tapered segment on said return portion, said tapered segment tapered generally inwardly toward the throat between the return portion and the shank.

4. The improved double locking snap hook described in claim 1, wherein said flange segment is generally perpendicular to the shank of the double locking snap hook.

5. The improved double locking snap hook described in claim 1, wherein said support slot is positioned in the elongated neck portion of the shank.

6. An improved double locking snap hook for engaging a slot in a wall form bracing, the double locking snap hook having a shank with a first end, an intermediate portion and a second end, the shank having an elongated neck portion extending between the first end and the intermediate portion, a return portion projecting from the first end of the shank forming a throat between the elongated neck portion of the shank and the return portion, a spring biased latch member pivotally mounted to the shank engageable with the return portion, and a spring biased lock member pivotally mounted to the shank for regulating the motion of the spring biased latch member, the improvement comprising:

a generally rectangular support slot positioned in the elongated neck portion of the shank; and a flange segment projecting outwardly from the shank, positioned between the intermediate portion and the first end of the shank, and between the throat and said support slot.

7. The improved double locking snap hook described in claim 6, wherein said flange segment is generally perpendicular to the shank of the double locking snap hook.

8. The improved double locking snap hook described in claim 6, further comprising:

a tapered segment on said return portion, said tapered segment tapered generally inwardly toward the throat between the return portion and the elongated neck portion of the shank.

9. A double locking snap hook for engaging a slot in a wall form bracing for use in cooperation with a worker safety device, the double locking snap hook comprising:

a shank having a first end, an intermediate portion and a second end, said shank having a return portion at said first end to define a hook, said return portion including a nose spaced from said shank to define a hook throat, and said shank having an elongated neck portion extending between said intermediate portion and said first end;

a spring biased latch member including a latch body, first spring means within said latch body for urging said latch member into a first, latched position, said latch body further including a first end pivotally mounted on said shank and a second end engageable with said hook nose to close said hook throat, said latch member being movable between said first, latched position and a second, open position, said second end of said latch body engaging said hook nose when said latch member is located in said first, latched position;

spring biased locking means passing through said latch member, said locking means being pivotally attached to said shank for releasably locking said latch member into said first, latched position, said spring biased locking means including a lock body and a second spring means within said lock body for urging said locking means into a locking position in restraining engagement with said latch member when said latch member is located in said first, latched position;

a flange segment projecting outwardly from said shank, positioned between said intermediate portion and said first end of said shank, adjacent to said throat, whereby said flange segment reduces twisting of the snap hook after engagement with the slot of the wall form bracing; and attachment means associated with said shank to enable attachment of the snap hook to the worker safety device.

10. The double locking snap hook described in claim 9, wherein said attachment means comprises a support slot positioned in said shank.

11. The double locking snap hook described in claim 10, wherein said support slot is positioned in said elongated neck portion of said shank.

12. The double locking snap hook described in claim 10, further comprising:

a tapered segment on said return portion, said tapered segment tapered generally inwardly toward said hook throat and extending between said return portion and said nose.

13. The double locking snap hook described in claim 9, wherein said flange segment extends generally perpendicular to said shank.

14. A double locking snap hook for engaging a slot in a wall form bracing for use in cooperation with a worker safety device, the double locking snap hook comprising:

a shank having a first end, an intermediate portion and a second end, said shank having a return portion at said first end to define a hook, said return portion including a nose spaced from said shank to define a hook throat, and said shank having an elongated neck portion extending between said intermediate portion and said first end;

a spring biased latch member having a first end and a second end, said first end being pivotally attached to said shank, said second end being engageable with said hook nose to close said hook throat, said latch member being movable between a first, latched position and a second, open position, said second end of said latch body engaging said hook nose when said latch member is located in said first, latched position;

spring biased locking means cooperative with said latch member, said locking means being pivotally attached to said shank for releasably locking said latch member into said first, latched position; and attachment means associated with said elongated neck portion of said shank to enable attachment of the snap hook to the worker safety device.

15. The double locking snap hook described in claim 14, further comprising:

a flange segment projecting outwardly from said shank, positioned between said intermediate portion and said first end of said shank, adjacent to said throat, whereby said flange segment reduces twisting of the snap hook after engagement with the slot of the wall form bracing.

16. The double locking snap hook described in claim 15, wherein said attachment means comprises a support slot.

17. The double locking snap hook described in claim 15, wherein said flange segment is positioned on said elongated neck portion adjacent said hook throat.

18. The double locking snap hook described in claim 14, further comprising:

a tapered segment on said return portion, said tapered segment tapered generally inwardly toward said hook throat and extending between said return portion and said nose.

* * * * *